Patented Feb. 28, 1928.

1,660,625

UNITED STATES PATENT OFFICE.

WILHELM NEELMEIER, OF LEVERKUSEN-ON-THE-RHINE, AND WERNER REBNER, OF LEIPZIG, GERMANY, ASSIGNORS TO GRASSELLI DYESTUFF CORPORATION, OF NEW YORK, N. Y., A CORPORATION OF DELAWARE.

MORDANT DISAZO DYESTUFFS.

No Drawing. Application filed March 17, 1927. Serial No. 176,294, and in Germany March 24, 1926.

This invention relates to mordant disazo dyestuffs of the general formula:

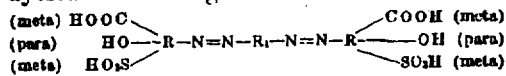

in which $R_1$ is the residue of a p-phenylenediamine compound, i. e, p-phenylene diamine or a homologue, derivative or substitution product thereof and R is an aryl residue of the benzene series substituted in the para-position to the azo bridge by an hydroxyl group and in the two meta-positions to the azo bridge by a carboxyl group and a sulfonic acid group, respectively, the aryl residue being further substituted or not by, e. g., halogen, alkyl, or other substituents.

The new dyestuffs are made in accordance with the present invention by sulfonating compounds of the general formula:

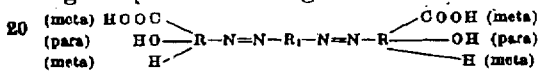

in which $R_1$ is the residue of a p-phenylenediamine compound, as described above, and R is an aryl residue of the benzene series having a free position meta to the azo bridge, and otherwise substituted or not by, e. g., halogen, alkyl, or other substituents as described above.

The new dyestuffs possess considerably improved dyeing properties as compared with the corresponding unsulfonated compounds, being particularly adapted for cotton printing. Printings thereof obtained with chromium acetate surpass those of all hitherto known dyestuffs of this series with respect to their light-, soaping-, and chlorine-fastness properties. They are in their dry pulverized form orange to brown powders soluble in concentrated sulfuric acid generally with a violet coloration and in water with an orange to brown coloration. Upon reduction with stannous chloride and hydrochloric acid they yield p-phenylene-diamine compounds and compounds having the formula:

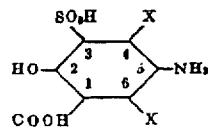

in which X stands for hydrogen, halogen, alkyl, or other substituents.

Under the conditions obtained in the following example the sulfonic acid group enters the ortho-position to the hydroxyl group of the salicylic acid residue. If the ortho-position were already occupied, sulfonation would not take place at all.

*Example.*—The diazo compound obtained from 257 parts by weight of p-amino benzene azo-salicylic acid in the customary manner is introduced at 0° C. into a solution of 160 parts by weight of salicylic acid and 350 parts by weight of sodium carbonate in 1000 parts water. 120 parts by weight of 30% caustic soda solution are slowly added to the homogeneous magma while stirring. The coupling is complete after several hours. The benzene-1.4-disazo salicylic acid, which is isolated by acidification, is when dry a yellowish brown powder, insoluble in water. Its sodium salt is difficultly soluble in water giving a yellowish brown coloration. The solution in concentrated sulfuric acid possesses a reddish violet coloration.

For the sulfonation 10 parts by weight of the disazo dyestuff, formed as described above, are introduced into 80 parts by weight of oleum (20%) with stirring and the mixture is heated for 8 hours at about 130 to 135° C. The cooled sulfonation mixture is poured into 150 parts of water and the separated sulfonated dyestuff is filtered off. The sulfonated dyestuff is then dissolved in water containing a small excess of sodium carbonate, salted out and dried. A reddish brown powder soluble in water with an orange red coloration and soluble in sulfuric acid with a reddish violet coloration is thus obtained. By chromium printing on cotton a yellow orange dyeing is obtained, which dyeing is fast to soaping and to light. The dyestuff in the form of its free acid has most probably the formula:

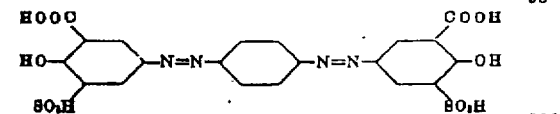

After being dried and pulverized it is a reddish-brown powder soluble in concentrated sulfuric acid with a violet coloration and in water with an orange-yellow coloration.

Upon reduction with stannous chloride and hydrochloric acid it yields 1.4-phenylene-diamine and 4-amino-2-hydroxy-benzene-3-sulfo-1-carboxylic acid.

Instead of the salicylic acid of the foregoing example other o-hydroxy carboxylic acids of benzene or substitution products thereof, such as chloro-compounds, in which one ortho-position and the para-position to the hydroxyl group are unoccupied such, for example, as m-cresotinic acid and xylenol carboxylic acid be employed and instead of p-phenylene diamine there can be used its homologues, derivatives or substitution products. The dyestuffs obtained as a result of these substitutions show only slight differences in properties from the salicylic acid disazo dyestuff of the example.

We claim:—

1. As new products, mordant disazo dyestuffs which in the form of their free acids have most probably the formula:

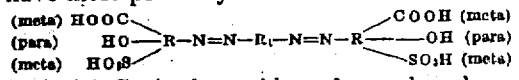

in which $R_1$ is the residue of a p-phenylenediamine compound and R is an aryl residue of the benzene series.

2. The disazo dyestuff having in the form of its free acid most probably the formula:

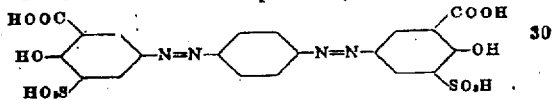

In testimony whereof we have hereunto set our hands.

WILHELM NEELMEIER.
WERNER REBNER.

ene-diamine and 4-amino-2-hydroxy-benzene-3-sulfo-1-carboxylic acid.

Instead of the salicylic acid of the foregoing example other o-hydroxy carboxylic acids of benzene or substitution products thereof, such as chloro-compounds, in which one ortho-position and the para-position to the hydroxyl group are unoccupied such, for example, as m-cresotinic acid and xylenol carboxylic acid be employed and instead of p-phenylene diamine there can be used its homologues, derivatives or substitution products. The dyestuffs obtained as a result of these substitutions show only slight differences in properties from the salicylic acid disazo dyestuff of the example.

We claim:—

1. As new products, mordant disazo dyestuffs which in the form of their free acids have most probably the formula:

in which $R_1$ is the residue of a p-phenylenediamine compound and R is an aryl residue of the benzene series.

2. The disazo dyestuff having in the form of its free acid most probably the formula:

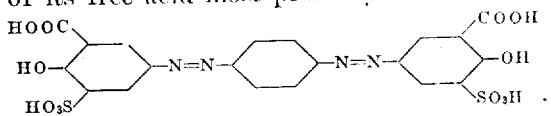

In testimony whereof we have hereunto set our hands.

WILHELM NEELMEIER.
WERNER REBNER.

---

CERTIFICATE OF CORRECTION.

Patent No. 1,660,625.       Granted February 28, 1928, to

WILHELM NEELMEIER ET AL.

It is hereby certified that error appears in the printed specification of the above numbered patent requiring correction as follows: Page 2, line 1, for the words "4-amino-" read "5-amino-"; and that the said Letters Patent should be read with this correction therein that the same may conform to the record of the case in the Patent Office.

Signed and sealed this 3rd day of April, A. D. 1928.

M. J. Moore,
Acting Commissioner of Patents.

Seal.

CERTIFICATE OF CORRECTION.

Patent No. 1,660,625.  Granted February 28, 1928, to

WILHELM NEELMEIER ET AL.

It is hereby certified that error appears in the printed specification of the above numbered patent requiring correction as follows: Page 2, line 1, for the words "4-amino-" read "5-amino-"; and that the said Letters Patent should be read with this correction therein that the same may conform to the record of the case in the Patent Office.

Signed and sealed this 3rd day of April, A. D. 1928.

Seal.

M. J. Moore,
Acting Commissioner of Patents.